(12) United States Patent
Shim

(10) Patent No.: US 9,575,218 B2
(45) Date of Patent: Feb. 21, 2017

(54) METHOD OF FORMING NANO-PATTERN ON SURFACE OF LENS AND LENS HAVING NANO-PATTERN ON SURFACE THEREOF

(71) Applicant: Hyundai Motor Company, Seoul (KR)

(72) Inventor: Jin Yong Shim, Chungcheongnam-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/542,612

(22) Filed: Nov. 16, 2014

(65) Prior Publication Data
US 2015/0192703 A1    Jul. 9, 2015

(30) Foreign Application Priority Data
Dec. 31, 2013  (KR) .......................... 10-2013-0168336

(51) Int. Cl.
*G02B 27/00*     (2006.01)
*G02B 1/118*     (2015.01)
*G02B 1/18*      (2015.01)

(52) U.S. Cl.
CPC ................. *G02B 1/118* (2013.01); *G02B 1/18* (2015.01)

(58) Field of Classification Search
CPC ........... G02B 1/18; G02B 1/118; G02B 1/113; C03C 1/008; C03C 17/3417; C03C 17/007; C08J 7/06
(Continued)

(56) References Cited

U.S. PATENT DOCUMENTS

| 7,767,287 B2 * | 8/2010 | Tanaka .................... C03C 1/008 428/141 |
| 2004/0191618 A1 | 9/2004 | Morin et al. |

(Continued)

FOREIGN PATENT DOCUMENTS

| JP | 10-312705 A | 11/1998 |
| JP | 2007-180501 | 7/2007 |

(Continued)

OTHER PUBLICATIONS

Hsieh, H.Y. et al., "Au-Coated Polystyrene Nanoparticles with High-Aspect-Ratio Nanocorrugations via Surface-Carboxylation-Shielded Anisotropic Etching for Significant SERS Signal Enhancement", Jrl. of Phys. Chem., C 2011, 115, pp. 16258-16267.
Hu, Liangbing, et al, "Electrowetting devices with transparent single-walled carbon nanotube electrodes", Applied Physics Letters, 90, 093124-3 (2007).

*Primary Examiner* — Scott J Sugarman
*Assistant Examiner* — Mustak Choudhury
(74) *Attorney, Agent, or Firm* — Mintz Levin Cohn Ferris Glovsky and Popeo, P.C.; Peter F. Corless

(57) ABSTRACT

The present invention provides a method of forming a nano-pattern on a surface of a lens, which comprises steps of: (i) filling a conductive material in an space between a lens and a substrate; (ii) applying a first coating solution to the surface of the lens filled with the conductive material by to a wet process; (iii) forming a nano-pattern on the surface of the lens on which the first coating solution is applied by performing a reactive ion etching process; and (iv) removing the first coating solution remaining on the lens surface and the conductive material filling in the space between the lens and the substrate.
The lens of the present invention is a functional lens with low reflectance, high transmittance and super water-repellency owing to a functional coating layer, thereby replacing the conventional lens on which an anti-reflective coating is
(Continued)

formed. Thus, the lens manufactured by the method of the present invention may be widely used in the fields where low reflectance and high transmittance are requires, such as a rear camera lens for vehicles.

13 Claims, 5 Drawing Sheets

(58) Field of Classification Search
USPC ....... 359/601, 441, 662, 647, 533, 548, 675, 359/627, 726; 204/192.1, 192.34, 192.35, 204/298.01, 298.31, 298.36; 428/141, 428/409, 432, 701, 702; 349/57, 116, 187; 427/388.4, 98.8–113, 97.1–98.3, 453, 523, 427/905, 524, 534, 307
See application file for complete search history.

(56) References Cited

U.S. PATENT DOCUMENTS

| | | |
|---|---|---|
| 2006/0140609 A1 | 6/2006 | Chen |
| 2009/0217516 A1 | 9/2009 | Pawlowski et al. |
| 2010/0033647 A1* | 2/2010 | Okita ................... H04N 5/2253 349/57 |
| 2010/0165471 A1* | 7/2010 | Yorita ................. B29C 33/3857 359/627 |

FOREIGN PATENT DOCUMENTS

| | | |
|---|---|---|
| JP | 2009-145772 | 7/2009 |
| KR | 10-2010-0029577 | 3/2010 |
| KR | 10-2013-0039477 A | 4/2013 |
| KR | 10-2013-0047397 | 5/2013 |

* cited by examiner

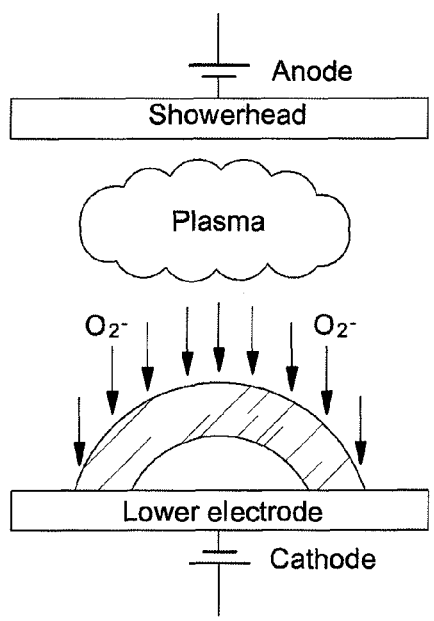
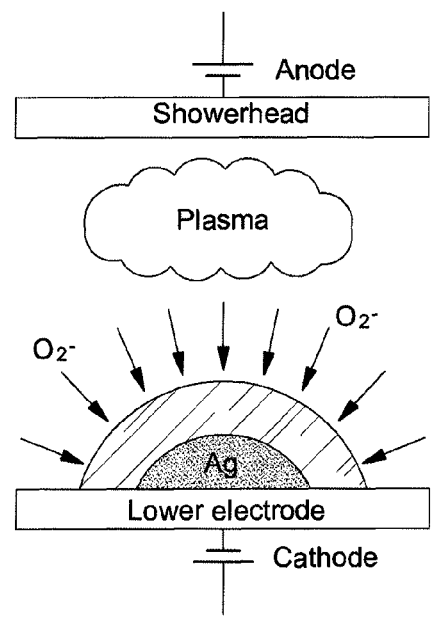
FIG. 3A
FIG. 3B

METHOD OF FORMING NANO-PATTERN ON SURFACE OF LENS AND LENS HAVING NANO-PATTERN ON SURFACE THEREOF

CROSS-REFERENCE TO RELATED APPLICATION

This application claims under 35 U.S.C. §119(a) the benefit of Korean Patent Application No. 10-2013-0168336 filed Dec. 31, 2013 the entire contents of which are incorporated herein by reference.

TECHNICAL FIELD

The present invention relates to a method of forming a nano-pattern on a surface of a lens by using a reactive ion etching process. More particularly, disclosed is a method for forming a micro-structure of nano-protrusions may include: providing bead particles of silver, silica, titanium oxide, or combinations thereof; coating the surface of the lens with the bead particles by a wet process; and etching gaps between the bead particles distributed on the surface of the lens by an oxygen plasma etching process. Since the formed nano-protrusion pattern may reduce light reflection and maximize transmittance, the method of the present invention may replace a conventionally applied anti-reflective coating. Accordingly, a method of forming such a nano-pattern on a surface of a lens and a lens on which the nano-pattern is formed by the same method are provided

BACKGROUND

Although about 4% of light is reflected from one surface of a common glass, a severe obstacle may be caused during use of an optical component which requires high light transmittance. Therefore, an anti-reflective coating which reduces the loss of reflected light has been widely applied to both surfaces of a conventionally produced rear-view camera lens. The anti-reflective coating may be applied by vacuum deposition, but its manufacturing apparatus may be complicated and manufacturing cost thereof may be high.

Particularly, for the conventionally produced rear-view camera lens, the surface has been coated with an anti-reflective coating to improve transmittance by reducing light reflection. For example, as illustrated in FIG. 1, when the anti-reflective coating is performed on both surfaces of the lens, scattered reflection of light which is entered into the lens may be reduced and transmittance thereof may increase. The anti-reflective coating typically has a structure in which aluminum oxide ($Al_2O_3$) and magnesium fluoride ($MgF_2$) are deposited as an anti-reflective material, and the entire thickness of the coating layer is about 120 nm. FIG. 1 shows a cross-sectional view of a conventional lens on which an anti-reflective coating is applied.

The conventional anti-reflective coating techniques may simply improve transmittance through the reduction of reflection, and when a functional coating layer such as a water-repellent coating, a hydrophilic coating and an anti-fogging coating is applied thereto additionally, adhesion between the anti-reflective coating layer and the anti-fouling coating layer may be very weak, which may result in deteriorating adhesive strength, and the coating process may not be efficient.

In such conventional anti-reflective techniques, $Al_2O_3$ is coated on the inside while $MgF_2$ is coated on the outside. When a water-repellent coating is applied, weak durability and weather resistance may deteriorate due to repelling force between the fluorine functional groups located at the outside of the anti-reflective coating layer and the fluorine functional groups of the water-repellent coating. In the case of other functional coatings, binding strength may be reduced due to the fluorine functional group of the low reflective coating layer. Accordingly, it is difficult to apply such a functional coating to the anti-reflective coating.

In the related art, a method for manufacturing a lens having a functional nano-pattern has been developed. The method includes forming a photonic crystal pattern on a molded member and pressurizing the molded member on a curved unit of the lens, thereby forming the photonic crystal pattern on the surface of the lens. The above method may be useful for manufacturing a lens having a functional nano-pattern which improves light transmittance by minimizing the loss of reflection. However, the manufacturing process of the lens having such a pattern may be complicated. Furthermore, when the lens is used as a rear-view camera lens for vehicles, its transmittance may be significantly reduced due to light reflection.

Thus, in order to overcome above problems of the anti-reflective coated lens in the related art, a lens with improved coating properties, such as high transmittance by reducing of light reflection, super-water repellency, weather resistance and maximized durability, is strongly desired.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described problems associated with the related art.

We now provide new methods for forming a nano-pattern of a lens surface through the structural modification of the lens surface by etching rather than a physical/chemical coating method on the surface of the surface of the lens. The lens, furthermore, may have significantly improved water repellency, for example, contact angle of about 150° or greater, due to a water-repellent coating which maintains an equal level of anti-reflective effect compared to the conventional anti-reflective coating techniques, and accordingly, various types of functional coatings may be applied.

Consequently, the present invention provides a novel method to form a microstructure of nano-protrusions; the thus obtained lens may replace the conventional lens on which an anti-reflective coating is applied.

In one aspect, the present invention provides a method of forming a nano-pattern on a surface of a lens, which comprises steps of:

(i) filling a conductive material in a space between a substrate and a lens;

(ii) applying a first coating solution to a surface of the lens filled with the conductive material by a wet process;

(iii) forming a nano-pattern on the surface of the lens on which the first coating solution is applied by performing a reactive ion etching process; and (iv) removing the first coating solution remaining on the surface of the lens and the conductive material filling the space between the substrate and the lens.

In an exemplary embodiment, the conductive material of the step (i) may be a metal paste or a carbon-based material which may function as an electrode. The metal paste may be, but not limited to, one or more selected from the group consisting of a silver paste, a copper paste, a silicon paste and a gold paste. The carbon-based material may be, but not limited to, one or more selected from the group consisting of carbon nanotubes, graphite, graphene, and combinations thereof.

In an exemplary embodiment, the first coating solution of the step (ii) may comprise one or more of bead particles selected from the group consisting of metal particles, silica, titanium oxide and combinations thereof. The metal particles may be one or more selected from the group consisting of silver (Ag), copper, silicon (Si), gold (Au) and combinations thereof.

In an exemplary embodiment, the reactive ion etching process of the step (iii) may be carried out by: ionizing injected oxygen gas to reactive oxygen by activated plasma, transferring the reactive oxygen toward a cathode electrode, and etching the surface of the lens on the electrode. In particular, the etching may form nano-protrusions by etching gaps between the bead particles applied on the lens surface. Further, in at least certain aspects, the nano-protrusion may have a size of about 50 nm to 1 µm, or 50 nm to about 200 nm, 250 nm, 300 nm, 400 nm, 500 nm, 600 nm, 700 nm, 800 nm or 900 nm. More particularly, in certain preferred aspects, a major portion or substantially all of the surface structures of a nano-pattern (e.g. at least 50%, 60%, 70%, 80%, 90% or 95%) of the total surface structures of a nano-pattern will have a size (e.g. length) within the above preferred size ranges.

In an exemplary embodiment, the method of the present disclosure may further comprise: a step (v) applying a second coating solution to the surface of the lens on which the nano-pattern is formed after the step (iv). The second coating solution of the step (v) may be, but not limited to, one or more functional coating solutions selected from the group consisting of a water-repellent coating solution, a hydrophilic coating solution, an anti-fogging coating solution, and combinations thereof. In particular, the water-repellent coating solution may provide a water repellent characteristics having a contact angle of about 150° or greater as a water-repellent coating.

In another aspect, the present invention provides a lens in which micro nano-protrusions in a size of about 50 nm to 1 µm may be formed by the method described above.

In an exemplary embodiment, the lens may be as a rear-view camera lens for a vehicle.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2A illustrates a method of forming a lens on which a conventional anti-reflective coating is formed and FIG. 2B illustrates an exemplary method of forming a lens having a nano pattern according to an exemplary embodiment of the present invention;

FIGS. 3A-3B show comparative views illustrating a conventional technique (FIG. 3A) and an exemplary embodiment of the present invention (FIG. 3B); FIG. 5A shows a 2-dimensional image of an exemplary nano-pattern is shown, and FIG. 5B shows an exemplary 3-dimensional image of an exemplary nano-pattern is shown.

Figure 1:
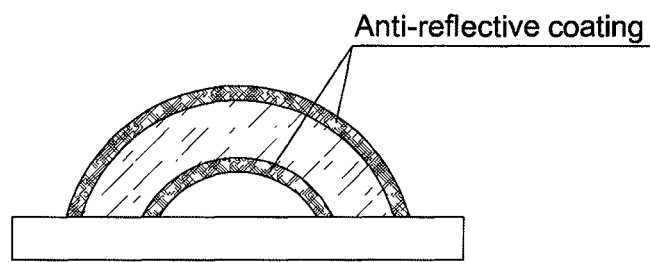
FIG. 1 shows a cross-sectional view of a lens on which a conventional anti-reflective coating is formed in the related art.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The term "nano-pattern" as used herein may include one or more surface structures (e.g.

protrusion) where one or more of the structures (e.g. protrusion) has a size (e.g. length) that is sub 10-micron or sub-micron. Preferably, a major portion or substantially all (e.g. at least 50%, 60%, 70%, 80%, 90% or 95% of the total) of the surface structures (e.g. protrusions) have a size (e.g. length) that is sub 10-micron or sub-micron. The surface surfaces may be preferably formed by an etching process such as plasma etching. A nano-pattern may include e.g. a protrusion, a concave feature, a convex feature or combined structures thereof without limitation. A nano-pattern according to an exemplary embodiment of the invention may provide an anti-reflective structure of a lens.

The present invention provides a method for forming a nano-pattern on a surface of a lens. The method may comprise: (i) filling a conductive material in a space between a lens and a substrate; (ii) applying a first coating solution to a surface of the lens filled with the conductive material by a wet process; (iii) forming a nano-pattern on the surface of the lens on which the first coating solution is applied by performing a reactive ion etching process; and (iv) removing the first coating solution remaining on the surface of the lens and the conductive material filling the space between the lens and the substrate In particular, a lens having a micro nano-protrusion in a size of about 50 nm to 1 μm may be formed by the method described above.

Hereinafter reference will now be made in detail to various exemplary embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method of forming a nano-pattern on a surface of a lens, which may comprise steps of: (i) filling a conductive material in a space between a lens and a substrate; (ii) applying a first coating solution to a surface the lens filled with the conductive material by a wet process; (iii) forming a nano-pattern on the surface of the lens on which the first coating solution is applied by performing a reactive ion etching process; and (iv) removing the first coating solution remaining on the surface of the lens and the conductive material filling the space between the lens and the substrate.

Figure 2A:
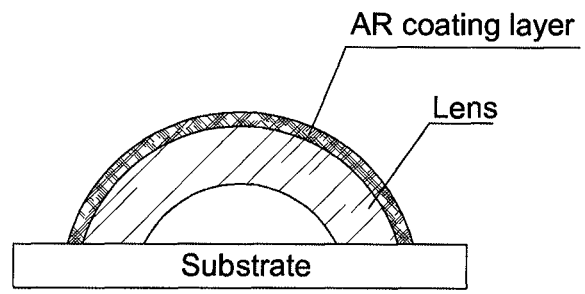
FIGS. 2A-2B show comparative views of a conventional art and an exemplary embodiment of the present invention.
Figure 2B:
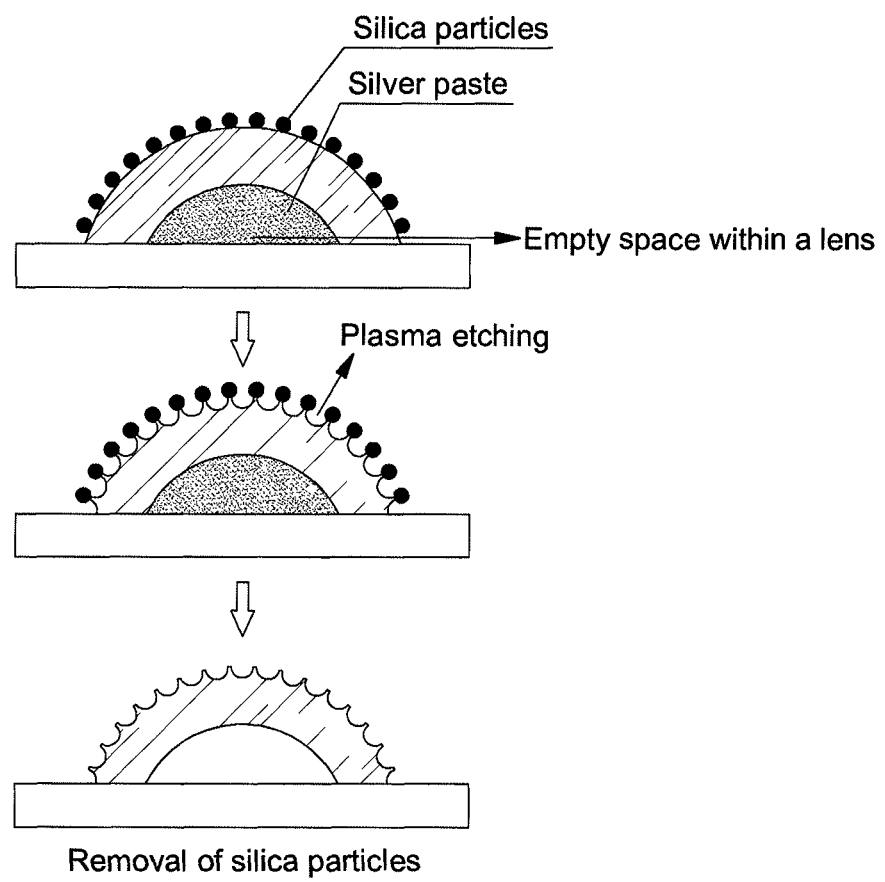

In FIG. 2B, provided is an exemplary method of forming a nano-pattern of a surface of a lens according to an exemplary embodiment of the present invention. Hereinafter, each step of the method is described in more detail.

The step (i) of filling a conductive material in a space between a lens and a substrate may be conducted for forming a uniform nano-pattern on the surface of the lens during the reactive ion etching process which is one of a dry plasma etching process.

In particular, the reactive ion etching (RIE) process in the step (iii) may be carried out as follows: a voltage may be applied to both of upper and lower electrodes so as to generate a potential difference, thereby activating plasma. The activated plasma may ionize injected oxygen gas to produce reactive oxygen and the reactive oxygen may be transferred toward a cathode electrode, subsequently a target material on the electrode may be etched by the reactive oxygen. In the conventional technique applying anti-reflective coating process to a rear camera lens, as depicted in FIG. 3A, since the reactive oxygen etches the target material perpendicularly toward the cathode, the entire surface may be etched in a vertical direction to the electrode without correction according to a lens curvature. Thus, uniform etching on the surface of the lens may not be obtained because of the empty space between the lens and the substrate.

To the contrary, the present invention may provide a technical solution to such difficulty above by fill the empty space between the lens and the substrate with a metal paste or a carbon-based conductive material which may act as an electrode. In particular, the metal paste may be a silver paste (Ag paste). When the empty space between the lens and the substrate is filled with the silver paste, the reactive oxygen may etch the surface of the lens perpendicularly at each point on the curvature due to the conductive material as an electrode, particularly as a cathode. Consequently, the entire surface may be etched while forming a uniform nano patterns thereon. In certain embodiments, metal paste other than silver paste, carbon-based conductive material and the like, which may act as an electrode, may be used to achieve the same effect. In addition, the same effect may obtained by using a metal zig which fits to a lens curvature and size. In certain embodiments, in addition to the silver paste, a metal paste may be, one or more selected from the group consisting of a copper paste, a silicon paste, a gold paste, and combinations thereof. A carbon-based material may be, but not limited to, one or more selected from the group consisting of carbon nanotubes (CNT), graphite, graphene, and combinations thereof. Furthermore, indium-tin oxide (ITO) as a conductive metal oxide may be used.

Accordingly, the step (i) may provide an optimized process for etching a curved surface, i.e. forming a uniformly etched nano patterns into a surface having an excessive curvature, different from the conventional techniques.

The step (ii) of applying a first coating solution to the surface of the lens filled with the conductive material may be performed by a wet process. In particular, the first coating solution may be, but not limited to, one or more bead particles selected from the group consisting of metal particles, silica, titanium oxide, and combinations thereof. In addition, a metal particle may be, but not limited to, one or more selected from silver, copper, silicon, gold (Au), and combinations thereof. Alternatively, beads made from silica ($SiO_2$) or titanium oxide ($TiO_2$) particles may be applied to the surface of the lens by the wet process, such as spraying, dipping or pasting, without limitation.

In a conventional imprinting stamp method, application of coating solutions to a flat panel may be restricted. In addition, a support made of epoxy resin or PDMS resin may be required, thereby making the manufacturing process inefficient and complicated. To the contrary, the coating method of the present invention may provide simplified manufacturing process and reduce production costs.

In addition, since the bead particles are distributed on the lens surface, the ionized reactive oxygen may etch gaps between the bead particles on the surface of the lens during the reactive ion etching process, thereby forming a uniform pattern of micro nano-protrusions.

The step (iii) is forming a nano-pattern by carrying out the reactive ion etching process on the surface of the lens to which the first coating solution is applied. As mentioned above, during the reactive ion etching process, injected oxygen gas may be ionized into reactive oxygen by the action of activated plasma, transferred toward a cathode electrode, and then, etch the surface of the lens on the electrode as shown in FIG. 3B.

As described above, the etching may be performed on the gaps between the bead particles on the lens surface, thereby forming of a uniform pattern of nano-protrusions. The nano-protrusion may be about 50 nm to 1 μm in size, or particularly, about 200 nm in size. When the size of the nano-protrusion is smaller than about 50 nm, improvement of transmittance compared to the lens to which a conventional anti-reflective coating is applied may not be obtained. When the size of the nano-protrusion is greater than about 1 μm, scattered reflection of light may occur, thereby leading to the occurrence of haze. Thus, the nano-protrusion preferably may have a size within the above range.

After the etching step is completed, the method of forming a nano-pattern according to an exemplary embodiment of the present invention may further include the step (iv) of removing the first coating solution remaining on the lens surface and the conductive material filling the space between the lens and the substrate.

The method for forming a nano-pattern according to an exemplary embodiment of the present invention may further include the step (v) of applying a second coating solution to the surface of the lens on which the nano-pattern is formed after the step (iv), which may form a functional coating layer. In particular, the second coating solution may be, but not limited to, one or more functional coating solutions selected from the group consisting of a water-repellent coating solution, hydrophilic coating solution, an anti-fogging coating solution, and combinations thereof. Various types of the functional coating solutions may be easily applied without limitation. Further in particular, since the water-repellent coating solution is super-water-repellent having a contact angle of about 150° or greater, the present invention provides a lens with improved transmittance and maximized functionality.

Accordingly, since various types of functional coating layer may be formed on the micro nano-protrusion according to various exemplary embodiments of the present invention, adhesiveness to a substrate may be maximized. In the related art, however, adhesiveness may be deteriorated due to poor binding strength between a functional coating layer and an anti-reflective coating layer, and coating quality may be reduced. When a functional coating layer is formed by the modification of a surface structure of a lens according to various exemplary embodiments of the present invention, binding strength to various types of functional coating layers may be significantly improved and a dense coating structure due to the formation of nano-protrusions may be constructed.

In another aspect, the present invention provides a lens in which the micro nano-protrusions may be formed in a size (e.g. length) of about 50 nm to 1 μm manufactured the above method. Such lens of the invention may suitably comprise one or more nano-protrusions having a size (e.g. length) of about 50 nm to about 200 nm, 250 nm, 300 nm, 400 nm, 500 nm, 600 nm, 700 nm, 800 nm or 900 nm. More particularly, in certain preferred aspects, a major portion or substantially all of the surface structures of a nano-pattern (e.g. at least 50%, 60%, 70%, 80%, 90% or 95%) of the total surface structures of a nano-pattern will have a size (e.g. length) within the above size ranges.

The lens in which the micro nano-protrusions are formed on its surface may be suitably used as a rear-view camera lens for vehicles which requires low reflectance and high transmittance.

EXAMPLES

The following examples illustrate the invention and are not intended to limit the same.

Example 1

SF Lens (Surface Etching Lens)

A silver paste (Ag Paste) was filled in a space between a lens and a substrate as a conductive material. Subsequently, silica bead particles were applied to the surface of the lens by spraying during a wet process. The lens was subjected to reactive ion etching under normal pressure for 15 min, to thereby manufacturing a lens having a nano-protrusion pattern in a size of about 100 to 150 nm formed on the surface of the lens.

Example 2

SE+AF Lens (Surface Etching+Anti-fouling Lens)

An anti-fouling coating (AF-fouling) including fluorine was applied by vacuum deposition to the surface of the lens manufactured in Example 1, on which the nano-protrusion pattern was formed. Accordingly, a lens where the anti-fouling coating was formed on the nano-pattern was manufactured.

Comparative Example 1

AR Lens (Anti-reflective Coating Lens)

An anti-reflective coating solution including $Al_2O_3$ and $MgF_2$ was deposited under vacuum on the surface of a lens, to thereby manufacture a lens having an anti-reflective coating layer. In particular, $Al_2O_3$ was deposited under vacuum on the lens surface in a thickness of about 20 nm so as to form a primary coating, followed by vacuum deposition of $MgF_2$ thereon in a thickness of about 100 nm to form a secondary coating.

Comparative Example 2

AR+AF Lens (Anti-reflective Coating+Anti-fouling Lens)

An anti-fouling coating (AF-fouling) including fluorine was applied by vacuum deposition to the surface of the lens manufactured in Comparative Example 1, on which the anti-reflective coating layer was formed. Accordingly, a lens where the anti-fouling coating was formed on the anti-reflective coating layer was manufactured.

Comparative Example 3

Bare Lens

The lens in Examples and Comparative Examples but was not treated, was used as a control.

The lenses manufactured according to Examples 1, 2 and Comparative Example 1-3 were subjected to the measurement of transmittance and a contact angle as follows.

Test Example 1

Measurement of Transmittance

Transmittance of the lenses manufactured in Examples 1, 2 and Comparative Examples 1~3 was measured by using a transmittance meter (Spectro-photometer) at a wavelength ranging from about 350 to 1000 nm, and the resulting values measured at 550 nm are shown in Table 1FIG. 4 is a graph showing transmittance of the lenses produced in Comparative Examples 1-3.

TABLE 1

Results of measuring transmittance

|  | Comparative Example 1 AR lens | Comparative Example 2 AR + AF lens | Example 1 SE lens | Example 2 SE + AF lens |
|---|---|---|---|---|
| Transmittance (at 550 nm) | 94% | 90% | 97.3% | 97.1% |

As shown in Table 1, the lenses according to exemplary embodiments of the present invention showed about 97.3% of transmittance, while the lenses on which the conventional anti-reflective coating was formed showed about 94-95% of transmittance. It has been confirmed from these results that when the micro nano-pattern was formed on the surface of the lens according to the present invention, the lens may have significantly improved transmittance due to low light reflection effect.

Figure 4:
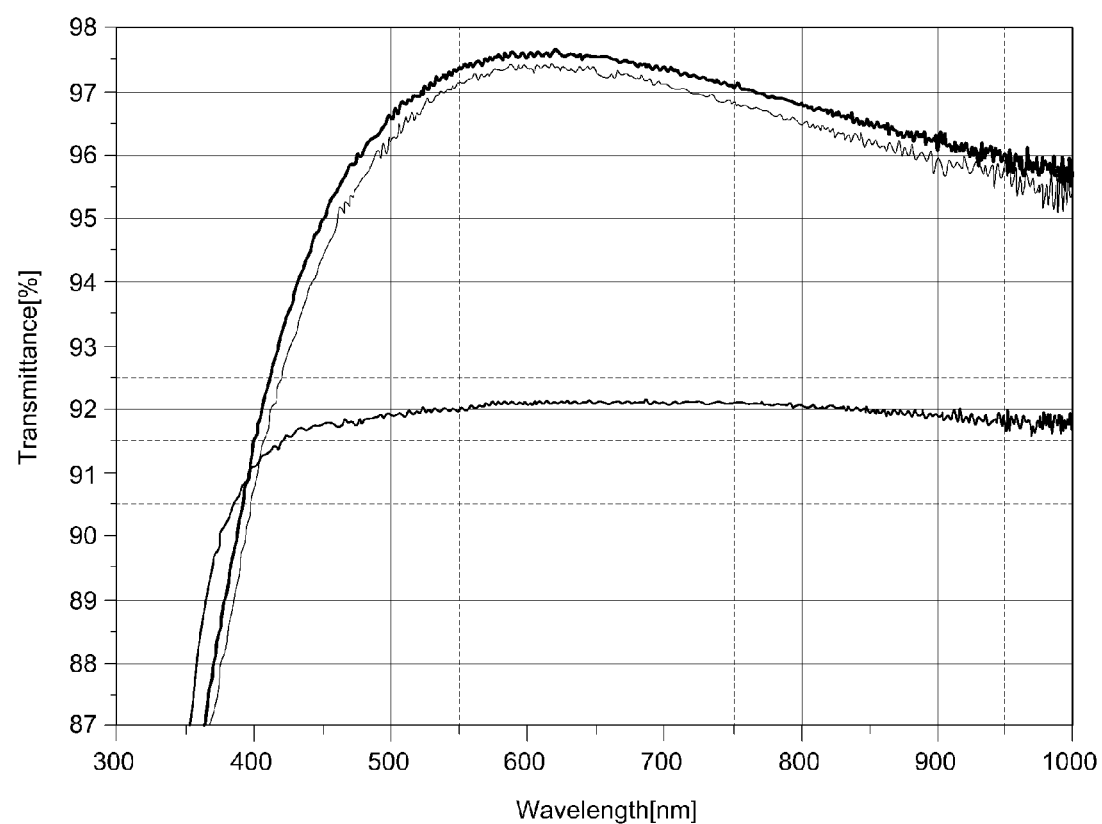
FIG. 4 is an exemplary graph showing transmittance of exemplary lenses produced in Comparative Examples 1~3.
Figure 5A:
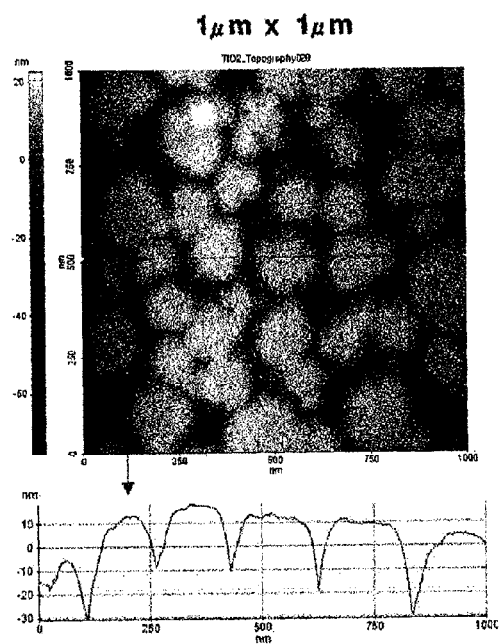
FIGS. 5A-B are microscopic images from AFM (atomic force microscopy) of an exemplary lens on which a nano-pattern is formed according to an exemplary method of forming a nano-pattern on a surface of the lens according to an exemplary embodiment of the present invention (Example 1).
Figure 5B:
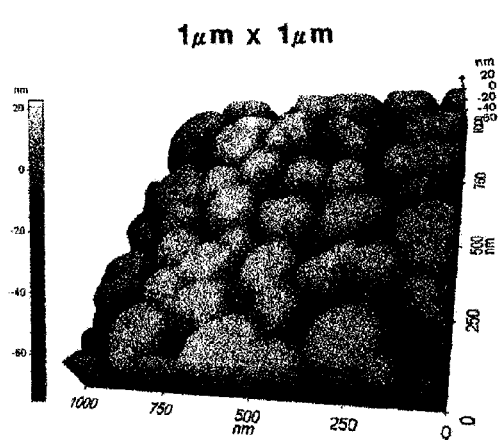

In addition, FIG. 4 is a graph showing transmittance of the lenses produced in Comparative Examples 1~3. According to FIG. 4, the lens having no coating layer showed about 91 to 92% of transmittance, while the lens having the conventional anti-reflective coating showed about 94 to 95% of transmittance, thereby confirming that the anti-reflective coating layer makes transmittance increased by lowering light reflection. However, the lens manufactured by exemplary methods of the present invention showed about 97% or greater of transmittance, and thus, its transmittance may be significantly improved compared to that of the lens having no treatment (Comparative Example 3) and the lens on which the anti-reflective coating layer was formed (Comparative Example 1 or 2).

Test Example 2

Measurement of a Contact Angle

To each surface of the lenses manufactured in Examples 1, 2 and Comparative Examples, 1, 2, about 1 μl of an aliquot was dropped, and then, a contact angle was measured by using a contact angle analyzer. The results are shown in Table 2 below.

TABLE 2

Results of measuring a contact angle

|  | Comparative Example 1 AR lens | Comparative Example 2 AR + AF lens | Example 1 SE lens | Example 2 SE + AF lens |
|---|---|---|---|---|
| Contact angle | 65° | 109° | 49° | 152° |

As shown in Table 2, the lens of Example 2, in which the nano-protrusions and anti-fouling coating layer were formed according to an exemplary embodiment of the present invention, shows highly improved water-repellency having a contact angle of about 152°. However, the lens of Comparative Example 2, although the same anti-fouling coating layer was formed thereon, its contact angle was 109°, indicating poor water-repellent coating quality.

Accordingly, when the conventional anti-reflective coating layer was formed, adherent force between the anti-reflective coating layer and the anti-fouling coating layer may not be sufficient, and its adhesive strength may be reduced, thereby deteriorating water repellency. In particular, when the anti-fouling coating of Comparative Example 2 is applied, durability and weather resistance may be reduced due to repelling power between fluorine functional groups deposed on the outside of the anti-reflective coating layer (a structure where $Al_2O_3$ and $MgF_2$ were deposited thereon) and fluorine functional groups of the anti-fouling coating layer, and thus, a functional coating may not be applied thereto effectively.

Therefore, the method for forming a nano-pattern according to the present invention can provide the lens which has an improved transmittance compared to that of the lens with the conventional anti-reflective coating layer. In addition, a functional coating may be easily applied to the lens of the present invention, and thereby providing maximized durability such as weather resistance and scratch resistance.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of forming a nano-pattern on a surface of a lens, comprising steps of:
   (i) filling a conductive material in a space between a lens and a substrate;
   (ii) applying a first coating solution to the lens surface filled with the conductive material by a wet process;
   (iii) forming a nano-pattern on the surface of the lens on which the first coating solution is applied by performing a reactive ion etching process, wherein surface of the lens etched perpendicularly at each point on the lens curvature; and
   (iv) removing the first coating solution remaining on the surface of the lens and the conductive material filling in the space between the lens and the substrate, wherein the conductive material of the step (i) is a metal paste or a carbon-based material, wherein the conductive material functions as an electrode.

2. The method according to claim 1, wherein the metal paste is one or more selected from the group consisting of a silver paste, a copper paste, a silicon paste, a gold paste, and combinations thereof.

3. The method according to claim 1, wherein the carbon-based material is one or more selected from the group consisting of carbon nanotubes, graphite, graphene, and combinations thereof.

4. The method according to claim 1, wherein the first coating solution of the step (ii) comprises one or more of bead particles selected from the group consisting of metal particles, silica, titanium oxide, and combinations thereof.

5. The method according to claim 4, wherein the metal particles is one or more selected from the group consisting of silver (Ag), copper, silicon, gold (Au), and combinations thereof.

6. The method according to claim 1, wherein the reactive ion etching process of the step (iii) is carried out by ionizing injected oxygen gas to produce reactive oxygen by activated plasma, transferring the reactive oxygen toward a cathode electrode, and etching the surface of the lens on the electrode.

7. The method according to claim 6, wherein nano-protrusions are formed by the etching in gaps between the bead particles distributed on the lens surface.

8. The method according to claim 7, wherein the nano-protrusion has a size of about 50 nm to 1 μm.

9. The method according to claim 1, wherein the method further comprises a step (v) applying a second coating solution to the surface of the lens on which the nano-pattern is formed after the step (iv).

10. The method according to claim 9, wherein the second coating solution of the step (v) is one or more functional coating solutions selected from the group consisting of a water-repellent coating solution, a hydrophilic coating solution, an anti-fogging coating solution, and combinations thereof.

11. The method according to claim 10, wherein the water-repellent coating solution is applied to have a contact angle of 150° or higher during a water-repellent coating.

12. A lens in which micro nano-protrusions in a size of about 50 nm to 1 μmare formed by the method according to claims 1.

13. The lens according to claim 12, wherein the lens is used for a rear-view camera lens for a vehicle.

\* \* \* \* \*